(12) United States Patent
Cahana

(10) Patent No.: US 11,472,523 B2
(45) Date of Patent: Oct. 18, 2022

(54) AUTO-ADJUSTABLE BUOYANCY PRESSURE VESSEL FOR SCUBA

(71) Applicant: Aviad Cahana, Kula, HI (US)

(72) Inventor: Aviad Cahana, Kula, HI (US)

(*) Notice: Subject to any disclaimer, the term of this patent is extended or adjusted under 35 U.S.C. 154(b) by 0 days.

(21) Appl. No.: 17/265,174

(22) PCT Filed: Aug. 21, 2019

(86) PCT No.: PCT/US2019/047519
§ 371 (c)(1),
(2) Date: Feb. 1, 2021

(87) PCT Pub. No.: WO2020/041481
PCT Pub. Date: Feb. 27, 2020

(65) Prior Publication Data
US 2021/0300510 A1    Sep. 30, 2021

Related U.S. Application Data

(60) Provisional application No. 62/721,443, filed on Aug. 22, 2018.

(51) Int. Cl.
  *B63C 11/22*       (2006.01)
  *B63C 11/30*       (2006.01)
  *H04L 9/40*        (2022.01)
(52) U.S. Cl.
  CPC .......... *B63C 11/2245* (2013.01); *B63C 11/30* (2013.01); *H04L 63/0861* (2013.01); *H04L 63/102* (2013.01)
(58) Field of Classification Search
  CPC .. B63C 11/2245; B63C 2011/303; B63C 1/22
  See application file for complete search history.

(56) References Cited

U.S. PATENT DOCUMENTS 4,114,389 A    9/1978  Bohmrich
4,779,554 A   10/1988  Courtney
(Continued)

FOREIGN PATENT DOCUMENTS

GB         1532411       11/1978
GB         2495147        4/2013
WO    WO 2012/073749      6/2012

OTHER PUBLICATIONS

U.S. Appl. No. 16/097,836, Cahana, May 9, 2019.
(Continued)

*Primary Examiner* — Andrew Polay
(74) *Attorney, Agent, or Firm* — V Gerald Grafe

(57) ABSTRACT

SCUBA diving equipment is composed of a heavy SCUBA pressure vessel, buoyancy compensation device and a heavy weight system. Together with a constricting exposure suit the current setup makes for a rather cumbersome system. Perfect buoyancy is a term used in SCUBA diving to describe the ability of the diver to maintain its vertical position in the water column. Doing so requires a thorough understanding of the governing physics principles as well as considerable practice time. Together, the cumbersome nature of standard SCUBA systems and the physical and mental requirements of operating said systems underwater are a commercial hurdle, preventing many individuals from entering the sport. The present invention provides systems that can significantly simplify both elements by allowing water to occupy some of the pressure vessel internal volume. Such a pressure vessel can be used as both the breathing gas source as well as a buoyancy control device, reducing or even eliminating the need for additional weights and a separate buoyancy compensation device. Embodiments of the present invention also comprise a control system and one or more sensors to provide an automatic buoyancy system.

18 Claims, 3 Drawing Sheets

(56) References Cited

U.S. PATENT DOCUMENTS

| | | | | |
|---|---|---|---|---|
| 4,872,783 | A | * | 10/1989 | Greenwood ............ B63C 11/08 |
| | | | | 405/186 |
| 5,221,161 | A | | 6/1993 | Toy |
| 5,496,136 | A | | 3/1996 | Egan |
| 5,660,503 | A | | 8/1997 | Lewis |
| 2007/0248419 | A1 | * | 10/2007 | Uliel ........................ B63C 11/02 |
| | | | | 405/186 |
| 2010/0304629 | A1 | | 12/2010 | Onofri |
| 2018/0001980 | A1 | * | 1/2018 | Hulbert ................ A61B 5/0816 |
| 2018/0170486 | A1 | * | 6/2018 | Sinclair .................. B63B 22/20 |

OTHER PUBLICATIONS

Extended EPO search report of counterpart to U.S. Appl. No. 16/097,836, dated Jan. 8, 2020.
Response to extended EPO search report in counterpart to counterpart to U.S. Appl. No. 16/097,836.

* cited by examiner

AUTO-ADJUSTABLE BUOYANCY PRESSURE VESSEL FOR SCUBA

CROSS-REFERENCE TO RELATED APPLICATIONS

This application is a national stage application under 35 U.S.C. 371 of PCT application PCT/US2019/047519, filed 21 Aug. 2019, which claims priority to U.S. provisional application 62/721,443, filed 22 Aug. 2018. Each of the foregoing is incorporated by reference herein.

TECHNICAL FIELD

This invention relates to the field of underwater diving, and specifically to breathing apparatuses and methods the facilitate control of depth and buoyancy of the diver.

BACKGROUND OF THE INVENTION

The SCUBA diving industry had made significant technical progress in most areas. The common SCUBA system, however, is still very heavy and cumbersome to maneuver. Modern materials, especially composites, fiberglass and polymer-based materials can function as well as or better than steel or aluminum to contain the breathing gas mixture pressure at a much lighter weight. However, simply using lighter materials does not solve the problem because it only deals with one of the forces operating on a submerged object:

Gravity facilitates the downward force operating on a SCUBA tank. The total mass of the SCUBA at any given point in time is composed of:

(a) Its construction-related mass: a tank made of steel or aluminum is usually heavier than a tank made of lighter material such as composites, carbon fiber, etc.

(b) The density of the breathing gas mixture. The denser the gas, the heavier it is.

The upward force operating on a SCUBA tank is a function of its volume: Archimedes' principle states that the upward buoyant force that is exerted on a body immersed in a fluid is equal to the weight of the fluid that the body displaces. Since common SCUBA tanks have fixed volume, they displace a fixed amount of water and the upward force is constant. FIG. 1 provides an illustration of these forces.

Two of the three components influencing the tank vertical position while submerged remain constant through the dive: its construction related mass and its total volume. The third component is the total mass of the breathing gas. As the diver consumes the breathing gas throughout the dive, the pressure inside the SCUBA tank is reduced and with it the density of the breathing gas. For this reason, common scuba tanks (12 L at 200 BAR) are roughly 3 kg heavier at the beginning of the dive than at its end (12 L at 50 BAR). As a result, SCUBA divers take additional weight with them to maintain buoyancy towards the end of the dive.

New materials allow for a weight reduction of between two thirds and a half of the conventional SCUBA tank. The caveat is that the same SCUBA tank will be buoyant by a force roughly equal to this weight reduction. That, in turn, means that the diver has to carry the additional weight anyway to maintain neutral tank buoyancy, which defeats the purpose of building the SCUBA tank from lighter materials.

DISCLOSURE OF INVENTION

The present invention provides methods of constructing and using a lightweight SCUBA tank with a dynamic buoyancy feature, allowing it to decrease its volume when needed. This feature can also be used to vary the tank buoyancy at any point along the dive thereby reducing or even eliminating the need for the standard buoyancy system (i.e. a buoyancy compensation device and weight system). Combined, the total reduction of mass the diver needs to carry can be as much as 70%. Such a decrease in load quickly translates into many aspects of the SCUBA industry:

(1) The ability to bring a larger percentage of the population into the sport, especially these sectors of the population that finds the weight of the equipment to be a barrier.

(2) The ability to simplify the art of SCUBA diving buoyancy.

(3) Reduced energy costs in diving operations that carry SCUBA tanks and other equipment (trucks, boats, etc.)

(4) Increasing the safety of both recreational divers and diving professionals.

MODES OF CARRYING OUT THE INVENTION AND INDUSTRIAL APPLICABILITY

Description of the invention: A pressure vessel for SCUBA that allows manual and automatic buoyancy control.

Figure 1:
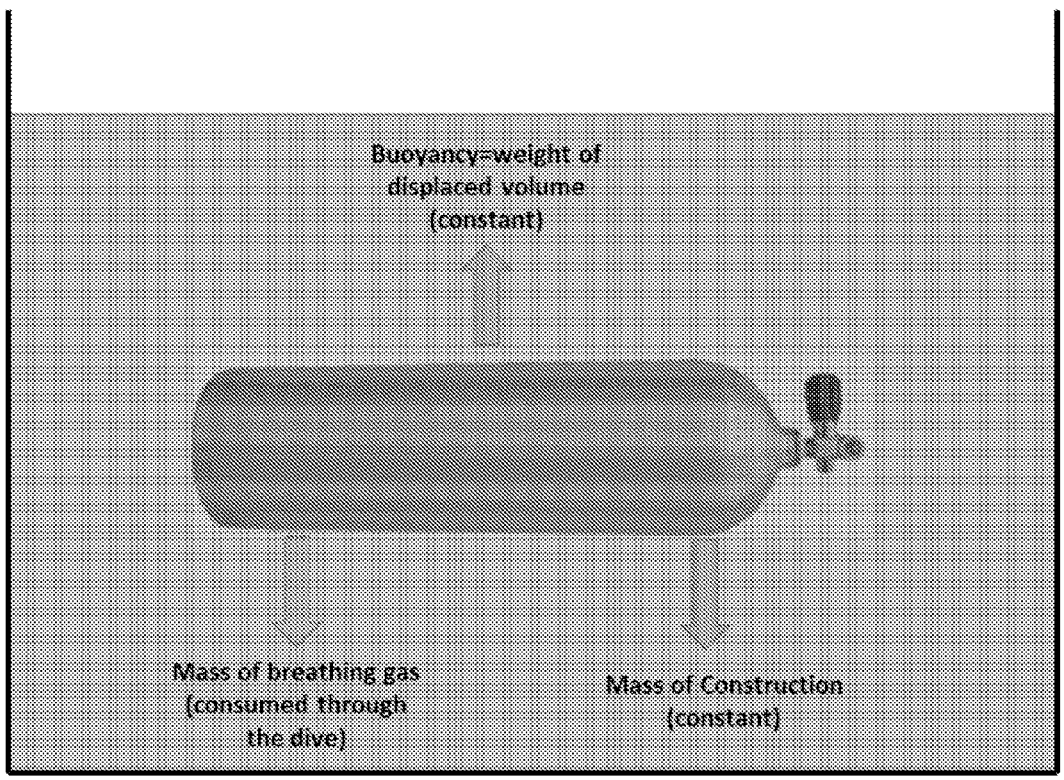
FIG. 1 is an illustration of the forces affecting an object's buoyancy while submerged.
Figure 2:
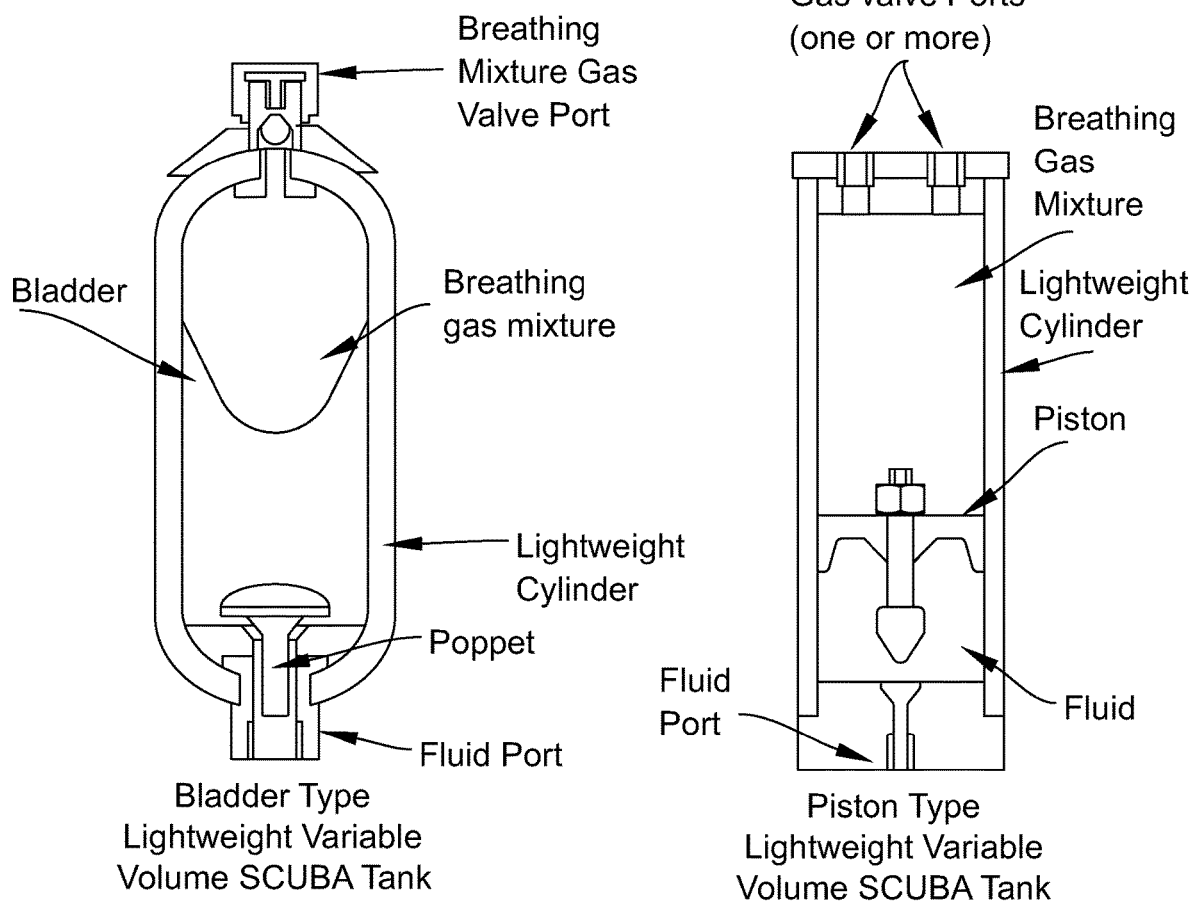
FIG. 2 provides schematic illustrations of variable volume tanks in accord with the present invention.

A variable volume SCUBA tank can be achieved by applying design principles as described herein. FIG. 2 shows two examples for the lightweight variable volume SCUBA tank. Other examples are disclosed in PCT/US2017/034896, filed 28 May 2017, which is incorporated herein by reference.

The working principle of the variable volume tank is that the buoyancy of the pressure vessel can be changed by delivering fluid into or out of the fluid chamber. The mass of the pressure vessel itself and its components remains constant, the only change is in the volume of the gas chamber, which affects the buoyancy of the pressure vessel. For this invention, the fluid can be seawater, fresh water or whatever fluid medium the SCUBA diver is submersed in.

A diving system provided by this invention can comprise the following elements:

(1) A pressure vessel that contains a chamber for the gas breathing mixture and a separate chamber for the fluid. The chambers are separated such that the contents of the two chambers cannot come in contact with one another. The separation is moveable such that the volume of either compartment can be made larger or smaller at the expense of the other.

(2) A gas valve, mounted to the gas compartment of the pressure vessel, so that air can be filled and used by the diver.

(3) A purge valve, allowing liquid to be removed from the fluid chamber.

(4) A fluid delivery system comprised of a pump which is coupled to an energy source and a control system. The drive for the pump can be pneumatic or electronic. Some pumps can be used to both fill and empty the fluid compartment by reversing the direction of the pump. This can be a preferred setup for the diving system described here because it can reduce the overall weight and number of components. A standard pump and separate fluid purge valve for the fluid compartment can provide an acceptable variation.

(5) A control, e.g., remote control, that communicates with the control system of the pump. The control system can comprise direct control of the pump, e.g., buttons or switches that allow the diver to directly control direction of fluid flow, rate of fluid flow (which includes both zero/max and variable rate embodiments), or combinations thereof, of the pump; and can also comprise more automated control systems such as programmable or special purpose computers, logic controllers, analog electronic circuits, ASICs, or other control systems known in the art and suitable for controlling the operation of a pump or similar fluid transfer device responsive to diver inputs and sensors (according to the needs of the particular embodiment).

(6) In some embodiments, the control system is able to receive and be programmable to respond to the diver's depth gauge. In some embodiments, the system can be equipped with a depth gauge separate from that of the diver. In some embodiments the system can be equipped with an inertial measurement unit so that vertical speed can be monitored either in combination with or instead of a depth gauge. Other sensors capable of indicating depth or rate of change in depth can also be used.

In some embodiments, the control system is able to receive and be programmable to respond to the diver's physiological parameters such as breathing patterns, heart rate, muscular or brain activity, blood chemistry, or other indications of physiological state. In some embodiments the system can be equipped with air-pressure or air-flow monitoring devices and a physiological sensing system such as a heart rate monitor.

Figure 3:
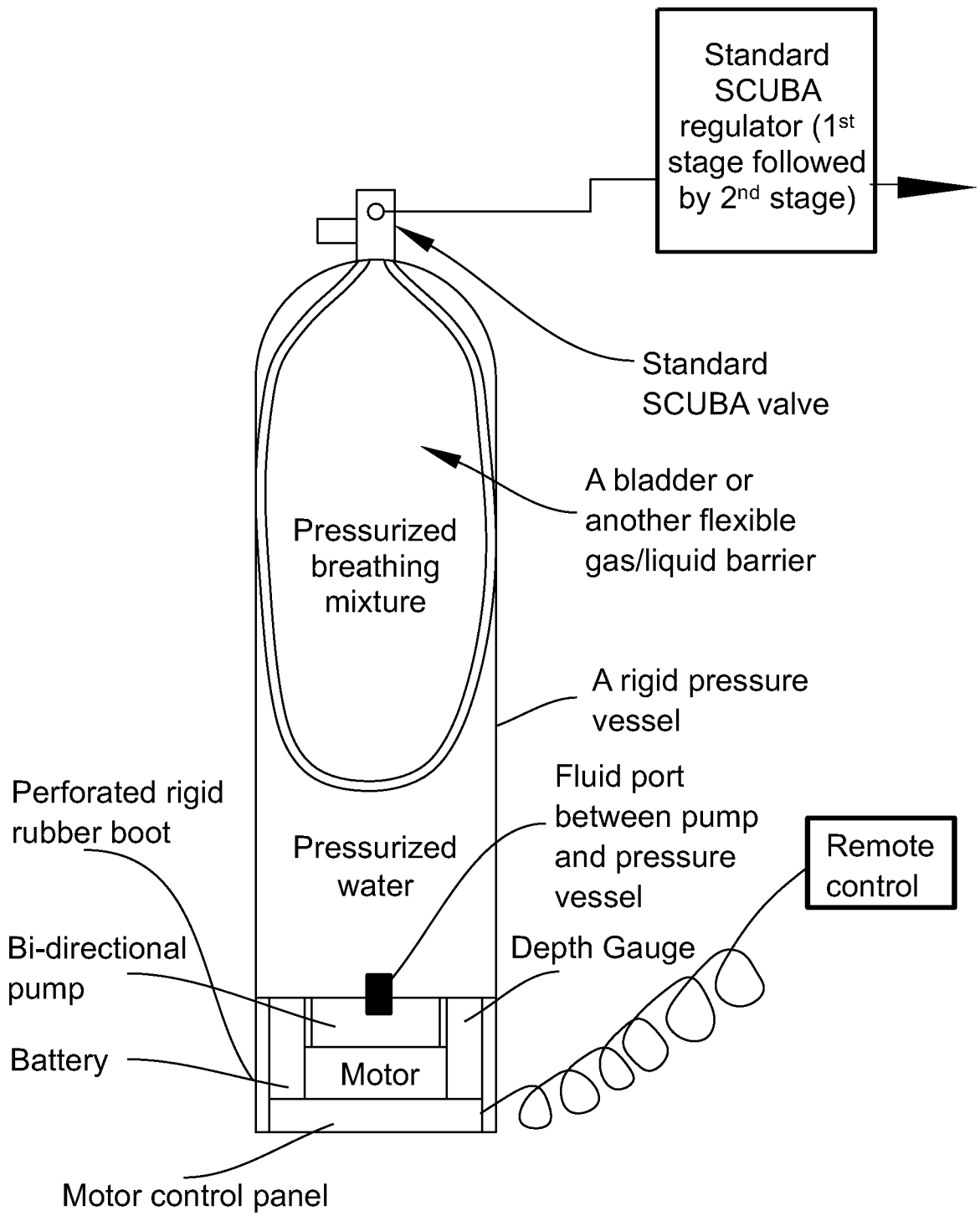
FIG. 3 is a schematic illustration of a controlled variable volume tank according to the present invention.

An example system configuration is illustrated in FIG. 3, and described below. The example embodiment provides a variable volume pressure vessel with electrical controls. It comprises a bi-directional pump that allows the pump to be used to communicate fluid into or out of the pressure vessel, using the motor directly to switch between the two modes. It can also use multiple pumps, or a unidirectional pump with a controlled fluid release valve to remove fluid from the pressure vessel.

System Operation:

The amount of liquid introduced into the pressure vessel is controlled such that the total buoyancy of the diver and its equipment is one of the following:

(1) Positive—meaning that the buoyancy of the diver and its equipment is greater than their combined weight. This will place an upward force on the diver towards the water surface.

(2) Neutral—meaning that the buoyancy of the diver and its equipment is equal to their combined weight. This will place a net zero force on the diver in terms of upward or downward movement.

(3) Negative—meaning that the buoyancy of the diver and its equipment is less than their combined weight. This will place a downward force on the diver away from the water surface and towards the bottom.

The three types of buoyancy described above can be tailored to the need of the diver in any stage of the dive. Incorporating in the system a pressure gauge to detect the depth of the pressure vessel and having the pressure gauge and/or inertial measurement unit communicate with the controls of the element that introduce fluids into the pressure vessel can allow automatic control of the system's buoyancy. Such a system allows the diver to reduce or even eliminate the need for a weight system and the common buoyancy compensating device (BCD) that is standard today. Examples include those described below.

Descending and the Automatically Controlled Negative Buoyancy Function:

A diver fitted with a system such as those described herein and common SCUBA gear but without weights and BCD enters the water. The pump of the pressure vessel is configured such that it can fill or empty the tank as needed. An electric remote control allows the diver to control the speed of the pump in each direction and thereby the rate at which the pressure vessel changes its buoyancy. The motor of the pump is connected to a controls circuit which allows the pump to respond to various signals in a predetermined manner. The pressure vessel system is also equipped with a pressure gauge sensor that can detect the ambient pressure while submerged. The pressure gauge is used to detect depth and is in communication with the controls board that operates the motor. See FIG. 3. The diver can control the system by direct control of the speed of the pump, or the speed of the pump can be controlled responsive to other input from the diver, e.g., an indication of rate of ascent or descent desired, or an indication to ascend or descend faster or slower than the current pace, or other diver input that can be correlated with a pump speed required to accomplish the diver's objective.

When the diver enters the water its total buoyancy (meaning diver and gear together) is positive and the diver floats. Once the diver wishes to descend the diver can activate the pump so that fluid is directed into the pressure vessel. The pressure vessel then becomes negatively buoyant until the diver begins to descend. If the diver chooses to not make any changes to the system, the diver rate of descending will accelerate because the diver's wetsuit and any other compressible gear will be reduced proportionally to the ambient pressure.

Alternatively, the diver can choose to descend in a controlled manner. For example, the diver can choose a descending rate of 2 feet per second. An automatically controlled descending rate can be desirable for divers that need more time to equalize anatomical cavities such as ears and sinuses. Another reason that controlled descent is desirable is when descending into blue water without a reference point such as a wall or the sea floor, divers find themselves rapidly descending and can easily exceed the safety limits of the intended dive plan. The pump's motor control can be in communication with the depth gauge of the system to allow the diver to set a specific descent rate. As soon as the diver begins descending, the controls can change the direction of the pump and remove water from the pressure vessel such that the buoyancy remains negative enough for the diver to maintain a 2 feet per second descent rate. If the depth gauge transmits a signal indicating too slow of a descent rate, the pump can add water to the tank.

Gaining, Regaining and Maintaining Perfect Buoyancy and the Automatically Controlled Perfect Buoyancy Function:

Once the diver reaches a depth where they would like to suspend themselves at a certain depth, the diver can use the controls to fill or empty the pressure vessel as needed until the diver reaches a state of perfect buoyancy.

Alternatively, the diver can choose to set a specific depth in which the diver wishes to remain suspended using the remote control. The controls board can use the input from the depth gauge to direct the motor and thereby the pump to maintain the diver's position by filling and emptying the pressure vessel as needed. For example, as the diver breathes in and out underwater, the change in the diver's lung volume plays a role in maintaining perfect buoyancy. The system's controls can be configured such that the system automatically compensates for these minor volume changes and maintains the diver at a specific depth range.

When the diver wishes to change into a new depth, the automatic perfect-buoyancy function can be turned off and the diver can swim and ascend or descend using the pressure vessel buoyancy system. Once the diver reaches a new depth destination, the process described herein can resume.

The diver can choose to allow the system to automatically establish neutral buoyancy at any depth the diver is in, or depth indicated by the diver. The control board can use the input from an inertial measurement unit to direct the pump motor and thereby the pump to maintain a state of minimal vertical movement. For example, a diver may swim up or down and then stop swimming at the desired depth. The system can be configured such that it automatically limits vertical movement to a very narrow range. Automatically in this context doesn't necessarily mean instantaneously. The system can 'catch-up' to the diver until vertical movement is reduced to within the programmable range.

Ascending and Automatically Controlled Positive Buoyancy Function:

One of the key elements of SCUBA is a controlled ascent to the surface. Because of the pressure decrease during the ascent, divers who ascend too quickly increase their potential exposure to decompression sickness. Lung expansion because of uncontrolled ascent is also a serious risk in SCUBA diving. Using the system described in this invention, the diver can set an ascent rate well within the recommended safety guidelines of 30 ft/min.

The system can be configured so that the pump's motor controls are in communication with the depth gauge of the system. The diver can set a specific ascent rate using the remote control, such that the pump's motor control responds to the signal from the depth gauge. As soon as the diver begins ascending, the controls can direct the pump to add or remove fluid from the pressure vessel such that the buoyancy remains positive enough for the diver to maintain a 30 feet per second ascent rate. If the depth gauge transmits a signal indicating too fast of an ascent rate, the pump can add water to the tank which will reduce buoyancy and slow down the ascent. Another example is at the recommended safety stop: the diver can set a safety stop and the system control can adjust the buoyancy to stop the ascent at the safety stop.

The system can also be used to rescue divers. The system can control buoyancy to implement an ascent to the surface, e.g., a "fast as possible" emergency ascent, or a "quick but safe" ascent, responsive to an input or condition. As an example, in a system with a physiological monitor the control system can be configured to implement an automatic ascent when the physiological monitor indicates a diver in a distressed condition, e.g., a heart rate monitor indicates heart failure, or breathing monitor indicates troubled breathing, or a brain activity monitor indicates brain activity not consistent with normal diving (e.g., asleep, fainted, unconscious), or a motion monitor indicates diver activity outside a predetermined profile for this dive. The control system can allow a diver to override the automatic ascent, which can be useful, as an example, if the physiological monitor experiences a fault that would cause an undesired automatic ascent.

The system can also be used to enforce territorial or depth limitations. As an example, the control system can be configured to maintain buoyancy such that an inexperienced diver cannot descend past a predetermined safe depth, or such that a diver cannot descend past a predetermined depth when lower depths are environmentally fragile. As another example, the control system can be configured to maintain buoyancy based on the location of the diver, e.g., to maintain the diver at a safe distance above dangerous bottom conditions, or conditions where the bottom is environmentally fragile, but allow greater depths when away from the area of such conditions. As another example, the control system can be configured to respond to a signal that the diver has left a predetermined dive area, and implement a controlled ascent so that the diver cannot stay underwater outside the predetermined dive area.

The system can also implement automatic ascents, or partial ascents, responsive to other dive conditions. For example, a diver can have a control input that must be activated by the diver at predetermined intervals of time, indicating that the diver is still functioning and not in distress. If the control input is not activated, the system can implement a controlled ascent, to the surface or to some predetermined depth at which second party evaluation or rescue is implemented. As another example, the control system can implement an automatic ascent responsive to predetermined conditions, e.g., a "recall" signal from another diver or the surface, a "low air" or "out of air" signal from the breathing apparatus, or a "lost" signal representative of a lost connection with a necessary tool or safety device or supervising diver.

Personalizing the Buoyancy Control System Response

Most air-integrated SCUBA computers available today monitor the breathing gas mixture consumption in real time. Since each individual lung capacity and breathing pattern differ so does their buoyancy response. On average, an experienced and calm diver will have roughly 10-12 breathing cycles in a minute and experience a difference of 2 liters in lung volume in the breathing cycle (i.e. inhalation and exhalation constitute one breathing cycle). The lung volume change therefore causes a difference of 2 Kg or 4.4 lbs every 5-6 seconds approximately. An experience diver constantly keeps in mind this volume change and use it as fine buoyancy adjustments. However, when a diver breathing pattern changes both in depth and rate, the volume change can be up to 6 liters per cycle which means a buoyancy force change of 6 kg or 13.2 lbs. This change can be a result of swimming against a current, real or perceived fear or any other reason.

The pump motor controls in some embodiments of the present invention can be in communication with an air-integrated computer, equipped with a learning capability for the diver average breathing pattern and able to detect increased breathing rates and volumes. The data from the computer can be used by the control system to adjust the rate at which the fluid is introduced or removed from the tank to better fit the needs of the diver at any given point in time. It is worth noting that the breathing cycle effect on buoyancy cancels itself out under normal diving conditions. However, as the breathing rate and volume increase, the cancellation effect can become less pronounced.

For example, an experienced and calm diver begins the dive and the control system detects that the breathing pattern is normal. Accordingly, the control system makes no adjustments to motor speed and the diver buoyancy is controlled as described above. At some point in the dive the diver enters a thermocline and the water temperature drops by 10 degrees Celsius. The diver's physiology needs to catch-up to this sudden change of temperature and as part of the response the rate and depth of breathing increases sharply to 6 liters every 3 seconds. The air-integrated computer detects the increased air consumption within 20 seconds or 5 breathing cycles. The computer then signals the controls board to respond by increasing the fluid flow into and out of the pump so that the rate of vertical movement of the diver will better match the desired rate set by the diver.

Note that the above are just examples of how the buoyancy of the tank and the diver can be affected by operating the pressure vessel using the electrical controls. These examples are not intended to be all encompassing of the different uses of the described invention.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

I claim:

1. A diving system for use by a diver, comprising:
   (a) a pressure vessel defining a breathing mixture chamber and a fluid chamber, each defining a volume, wherein the two chambers are separate from each other, where the volumes of the two chambers are correlated such that an increase in the volume of one chamber correlates with a decrease in the volume of the other chamber, and wherein the breathing mixture chamber is configured to contain a breathing mixture pressurized above ambient and to supply the breathing mixture to a gas communication system for breathing by a diver;
   (b) a fluid transfer system in fluid communication with the fluid chamber and with an environment external to the fluid chamber;
   (c) a control system responsive to input from the diver, sensors, or a combination thereof, configured to control the fluid transfer system to communicate fluid between the ambient environment and the fluid chamber.

2. The diving system of claim 1, wherein the fluid transfer system comprises a pump configured to transfer fluid from the ambient environment into the fluid chamber and a valve configured to release fluid from the fluid chamber into the ambient environment.

3. The diving system of claim 1, wherein the fluid transfer system comprises a pump configured to transfer fluid from the ambient environment into the fluid chamber, and from the fluid chamber into the ambient environment, responsive to a control signal.

4. The diving system of claim 1, wherein the control system comprises an input device controllable by the diver that specifies fluid transfer direction, fluid transfer rate, or a combination thereof.

5. The diving system of claim 1, further comprising a sensor indicating rate of change of depth; and wherein the control system comprises an input accepting an indication of a desired rate of depth change, wherein the control system is configured to control the fluid transfer rate and fluid transfer direction to adjust the buoyancy of the diving system to maintain the desired rate of depth change.

6. The diving system of claim 1, further comprising a sensor indicating rate of change of depth; and wherein the control system is configured to control the fluid transfer rate and fluid transfer direction to adjust the buoyancy of the diving system to maintain the rate of depth change within predetermined limits.

7. The diving system of claim 1, further comprising a sensor indicating depth; and wherein the control system is configured to control the fluid transfer rate and fluid transfer direction to adjust the buoyancy of the diving system to maintain the current depth responsive to an input from the diver.

8. The diving system of claim 1, further comprising a sensor indicating depth; and wherein the control system is configured to control the fluid transfer rate and fluid transfer direction to adjust the buoyancy of the diving system to maintain a depth determined from an input from the diver.

9. The diving system of claim 8, further comprising a sensor indicating rate of change of depth, and wherein the control system is configured to control the fluid transfer rate and fluid transfer direction to adjust the buoyancy of the diving system to maintain a depth determined from an input from the diver and to maintain the rate of change of depth within predetermined limits.

10. The diving system of claim 1, wherein the control system is configured to control the fluid transfer rate and fluid transfer direction responsive to breathing of the diver.

11. The diving system of claim 1, further comprising a sensor indicating depth, and wherein the control system is configured to control buoyancy to position the diver at a predetermined depth responsive to a signal indicative of the diver's physiological state.

12. The diving system of claim 11, wherein the predetermined depth is the surface, and wherein the signal is indicative of physiological distress of the diver.

13. The diving system of claim 11, further comprising a sensor indicating a physiological state of the diver.

14. The diving system of claim 1, further comprising a sensor indicating depth, and wherein the control system is configured to control buoyancy such that the diver does not descend below a predetermined depth.

15. The diving system of claim 1, further comprising a sensor indicating depth, and further comprising a sensor indicating the position of the diver, and wherein the control system is configured to control buoyancy to maintain the diver within a predetermined range of depths determined from the position of the diver.

16. The diving system of claim 1, wherein the control system is configured to control buoyancy to cause the diver to ascend responsive to an external signal.

17. The diving system of claim 1, wherein the control system is configured to control buoyancy to cause the diver to ascend responsive to a signal indicating a low supply of breathing gas.

18. The diving system of claim 10, wherein the control system is configured to control the fluid transfer rate and fluid transfer direction based on the amount of breathing mixture consumed by the diver.

* * * * *